(12) United States Patent
Parthasarathy et al.

(10) Patent No.: US 6,412,013 B1
(45) Date of Patent: Jun. 25, 2002

(54) SYSTEM FOR CONTROLLING DATA OUTPUT TO A NETWORK

(75) Inventors: Kavitha Parthasarathy, Ossining; Robert A. Cohen, Chappaqua, both of NY (US); Hayder Radha, Mahwah, NJ (US)

(73) Assignee: Koninklijke Philips Electronics N.V., New York, NY (US)

( * ) Notice: Subject to any disclaimer, the term of this patent is extended or adjusted under 35 U.S.C. 154(b) by 0 days.

(21) Appl. No.: 09/177,962

(22) Filed: Oct. 23, 1998

(51) Int. Cl.[7] .................................................. G06F 15/16
(52) U.S. Cl. ........................ 709/235; 709/230; 709/231; 709/232
(58) Field of Search ................................. 709/230–235; 370/230, 231, 232

(56) References Cited

U.S. PATENT DOCUMENTS

| | | | | |
|---|---|---|---|---|
| 5,400,329 A | * | 3/1995 | Tokura et al. | 370/232 |
| 5,402,252 A | * | 3/1995 | Kojima | 358/486 |
| 5,694,390 A | * | 12/1997 | Yamato et al. | 370/230 |
| 5,751,969 A | * | 5/1998 | Kapoor | 709/235 |

OTHER PUBLICATIONS

PHA 23,389, U.S. Serial No. 09/062,939 Filed: Apr. 20, 1998.
PHA 23,420, U.S. Serial No. 09/094,828 Filed: Jun. 15, 1998.

* cited by examiner

*Primary Examiner*—Ayaz Sheikh
*Assistant Examiner*—Frantz B. Jean
(74) *Attorney, Agent, or Firm*—Russell Gross

(57) ABSTRACT

A system which controls data output to a network determines a maximum amount of data that could be output to the network based on an amount of data that can be read from the network during a predetermined time period, and then obtains a difference between an amount of data that has actually been output to the network and the maximum amount. Thereafter, the system outputs, to the network and within the predetermined time period, an amount of data packets that is based on the difference. For a last data packet to be output to the network in the predetermined time period, the system determines a first number of bits by which an amount of data will exceed the difference in the event that the data packet is output to the network, determines a second number of bits by which an amount of data will fall short of the difference in the event that the data packet is not output to the network, and outputs the data packet in a case that the first number is less than the second number.

30 Claims, 6 Drawing Sheets

SYSTEM FOR CONTROLLING DATA OUTPUT TO A NETWORK

BACKGROUND OF THE INVENTION

1. Field of the Invention

The present invention is directed to a system for controlling the flow of data to a network based on a rate at which data is read from the network. The invention has particular utility in connection with transmitting video data over the Internet, since it reduces data overflow, data underflow, and network congestion, thereby enhancing video quality.

2. Description of the Related Art

Existing network systems currently have the ability to transmit real-time video, comprised of audio-visual data, between different nodes. The Internet in particular has, in recent-years, experienced a marked increase in the amount of video being passed therethrough. As anyone who has experienced networked video (in particular, Internet video) is aware, however, it leaves much to be desired. For example, motion in such video often appears stilted, rather than fluid. Likewise, image motion and audio data may not coincide, thereby further degrading the quality of the video.

There are a number of reasons for the foregoing problems with network video, one of which relates to flow control of data moving through the network. Taking the Internet as an example, the Internet uses user datagram protocol ("UDP") in processing data from "streaming" applications, i.e., multimedia applications which output "streams" of video data to the Internet. UDP, however, has no inherent flow control, meaning that it outputs video data without regard to the amount of data currently on the network. In cases where the network is already at capacity, this can result in a loss of video data, thereby decreasing the quality of the video, as described above. On the other hand, where there is excess capacity on the network, this can result in gaps in the video data, and thus in the resulting video, which likewise decreases the video's quality.

Additional problems also arise from the lack of flow control inherent, in particular, in UDP-orientated multimedia applications. More specifically, because these applications output video data without regard to the current capacity of the network, they can be a threat to existing applications, like ftp, telnet, etc., that run atop more socially-minded protocols such as transport control protocol ("TCP"). In fact, a proliferation of poorly-designed UDP multimedia applications can congest the Internet resulting, in the most extreme case, in a congestion collapse thereof.

Conventional developers have addressed the foregoing problems in the art by synchronizing the operation of a transmitter which outputs data to a network with the operation of a receiver which reads data from the network. For example, the Network Voice Terminal ("NeVoT") application, developed by the University of Massachusetts for audio-conferencing over a network, uses a single audio sampling clock to control transfer of audio data from an input device (e.g., a microphone) to the network, and from the network to an output device (e.g., a speaker). That is, each time the input device delivers a full block of audio to the application, one equal duration block of audio is copied from a playout buffer on the network to the output device.

While the foregoing solution reduces buffer overflow and underflow by coupling input and output timing, it has several drawbacks resulting from the fact that it does not take into account the characteristics of the intermediate network. For example, in the conventional flow control method described above, data is sent to the network at as high a speed as the network interface can handle, regardless of the bandwidth of the network. If the network has a bandwidth that cannot handle high bitrates, this will lead to congestion on the network, which can cause data loss and degrade network performance.

Accordingly, there exists a need for a system which controls the flow of data to a network, such as the Internet, so as to reduce both network congestions and the deleterious effects resulting from buffer overflow and underflow.

SUMMARY OF THE INVENTION

The present invention addresses the foregoing need by determining an amount of data that has been read from a network (e.g., the Internet) in a predetermined time period, and then outputting substantially the same amount of data to the network in the same predetermined time period. By controlling the rate at which data is output to the network in this manner, the present invention is able to reduce network congestion, without introducing substantial buffer overflows and/or underflows into the system.

Thus, according to one aspect, the present invention is a system (i.e., a method, an apparatus, and computer-executable process steps) which controls data output to a network. The system determines a maximum amount of data that could be output to the network based on an amount of data that can be read from the network during a predetermined time period, and then obtains a difference between an amount of data which has actually been output to the network and the maximum amount. Thereafter, the system outputs, to the network and within the predetermined time period, an amount of data packets that is based on the difference.

In preferred embodiments, these data packets include intra ("I") frames of video, together with predictive ("P") frames and/or bi-directional ("B") frames of video. In these embodiments, the intra frames are output to the network, while at least some of the predictive frames and/or the bi-directional frames are not. Whether the predictive and/or bi-directional frames are, or are not, output varies depending upon the bandwidth of the network. By virtue of these features of the invention, it is possible to preserve the most important frames (i.e., the intra frames) when the bandwidth of the network is not sufficient to accommodate all frames. This most often, although not always, occurs in the case of variable-bandwidth networks.

In other preferred embodiments of the invention, for a last data packet to be output to the network in the predetermined time period, the system determines a first number of bits by which an amount of data will exceed the difference in the event that the data packet is output to the network, determines a second number of bits by which an amount of data will fall short of the difference in the event that the data packet is not output to the network, and outputs the data packet in a case that the first number is less than the second number, but not in a case that the first number is greater than the second number. By virtue of these features, the invention is able to output an amount of data to the network which most closely corresponds to the network's capacity. The invention is therefore able to maintain as high a data throughput as possible under the circumstances, without substantial buffer overflow and/or underflow.

In still other preferred embodiments, the invention determines the maximum amount of data which could be output to the network based on a maximum amount of data that can be handled by a network segment having the least amount of available bandwidth. That is, in this case, the "bottleneck" (i.e., the portion of the network having the least amount of available bandwidth) will dictate the maximum rate at which data can be output to, and read from, the network. To accommodate this, the present invention allows the bandwidth of the bottleneck to control the flow of data to and from the network. This reduces the chances of network congestion and buffer overflow and underflow resulting from the bottleneck.

According to another aspect, the present invention is a network system in which flows of video data are controlled so as to reduce data congestion on the network. The network system includes a transmitter which codes the video data and which outputs coded video data to the network. Also included in the system is a receiver which reads the coded video data from the network at a predetermined rate (which is dictated, e.g., by the bandwidth of the network's bottleneck), which decodes the coded video data, and which forms images based on the decoded video data. According to the invention, the transmitter outputs the coded video data to the network at substantially a same rate at which the receiver reads the coded video data from the network. By outputting the coded video data to the network at substantially the same rate at which the receiver reads the coded video data from the network, the invention is able to reduce network congestion and, in addition, to reduce occurrences of substantial buffer overflow and underflow.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1:
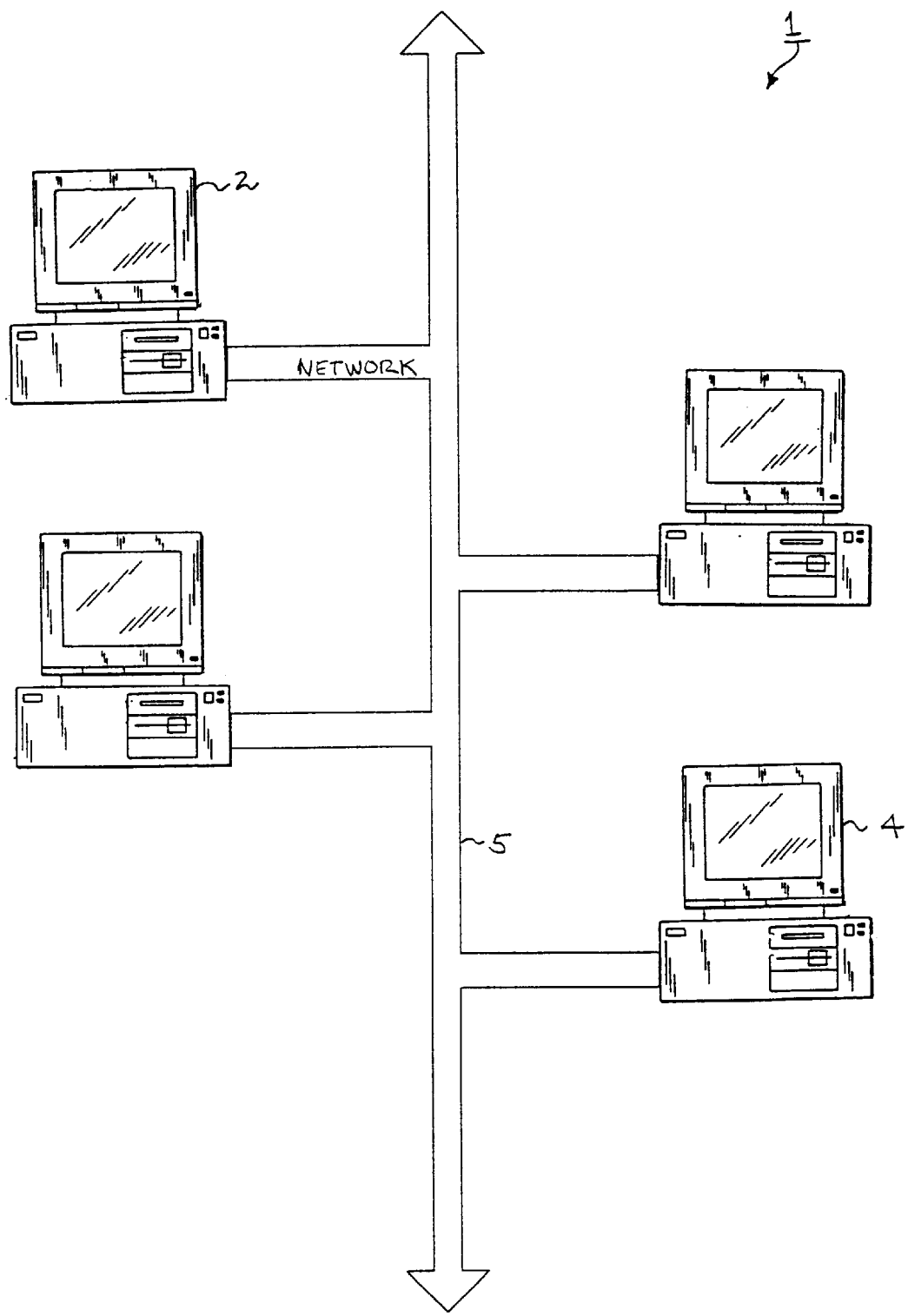
FIG. 1 shows a network system on which the present invention may be implemented.

FIG. 1 shows an example of a network system 1 on which the present invention may be implemented. As shown in FIG. 1, network system 1 includes plural nodes, such as 2 and 4, and network medium 5. Network medium 5 may be, e.g., an Ethernet cable, wireless link, or a combination thereof, over which data packets comprised of video data (i.e., audio-visual data) and other information are transmitted between various nodes. In this regard, network 1 can comprise any type of network, such as a local area network ("LAN"), a wide area network ("WAN"), a variable-bandwidth network, an ATM network, the Internet, etc.

For the purposes of the present invention, node 2 comprises a transmitter which receives video data from an input device, such as a digital video camera or the like (not shown), which codes the video data, and which outputs the coded video data to the network. Alternatively, node 2 could include pre-stored coded data, which is output to the network. For the purposes of the present invention, node 4 comprises a receiver which receives the coded video data. In operation, node 4 reads the coded video data from the network at a predetermined rate, decodes the coded video data, and forms images based on the decoded video data on an output device, such as its display screen or the like. As described in more detail below, flow control is effected by node 2 (the transmitter) by outputting the coded video data at substantially a same rate at which node 4 (the receiver) reads the coded video data from the network.

Nodes 2 and 4 can comprise any type of digital data transmitting and receiving devices. These include, but are not limited to, video conferencing equipment and a digital television system (e.g., a transmitter and a digital television and/or a settop box) such as that described in U.S. patent application Ser. No. 09/062,939, entitled "Digital Television System Which Selects Images For Display In A Video Sequence", filed on Apr. 20, 1998, the contents of which are hereby incorporated by reference into the subject application as if set forth herein in full. However, for the sake of simplicity, the invention will be described in the context of two networked computers, each of which has the capability to transmit video data to, and read video data from, the network in the manner described herein.

Figure 2:
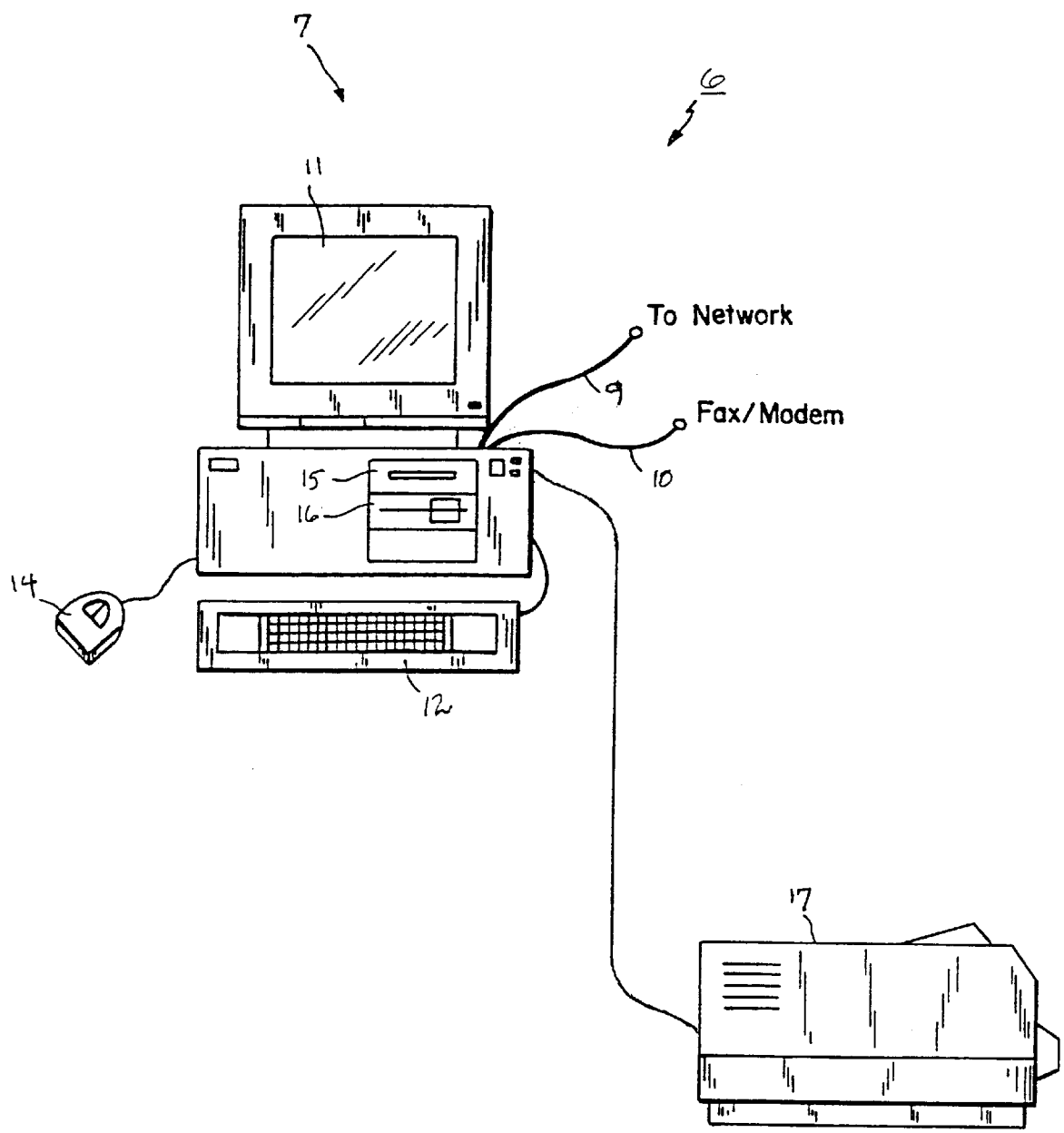
FIG. 2 shows a close-up view of computing equipment for video data transmitting and receiving nodes on the network system of FIG. 1.

FIG. 2 shows a representative embodiment of computing equipment 6 for the networked computers comprising nodes 2 and 4. As shown in FIG. 2, personal computer ("PC") 7 includes network connection 9 for interfacing to network 5 and fax/modem connection 10 for interfacing with the network or other devices such as a digital video camera (not shown) which inputs video data to PC 7. PC 7 also includes display screen 11 for displaying information (including video) to a user, keyboard 12 for inputting text and user commands, mouse 14 for positioning a cursor on display screen 11 and for inputting user commands, disk drive 15 for reading from and writing to floppy disks installed therein, and digital video disk ("DVD") drive 16 for inputting and accessing video stored on DVD. PC 7 may also have one or more peripheral devices connected thereto, such as printer 17 or the like.

Figure 3:
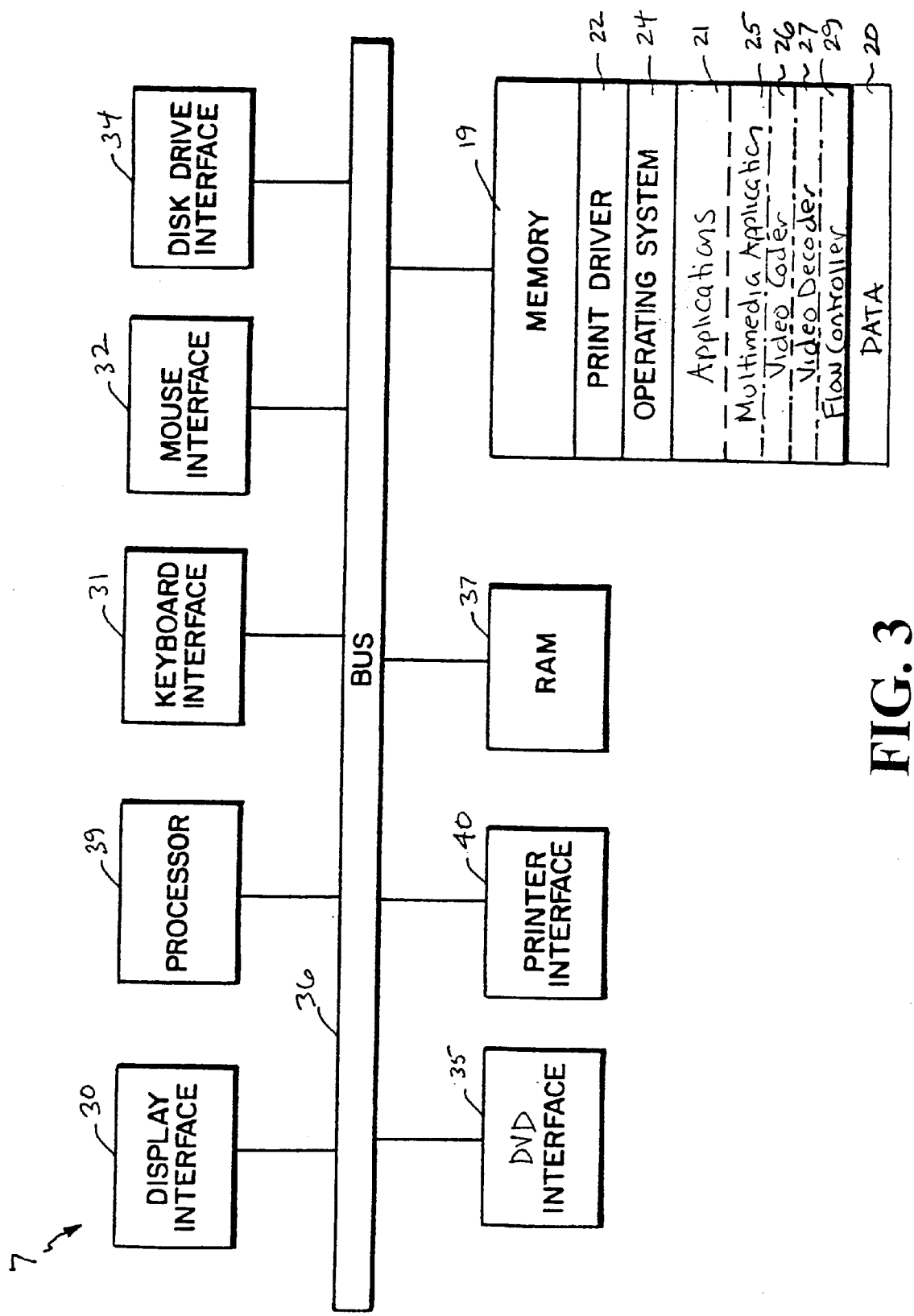
FIG. 3 shows the architecture of a PC included in the computing equipment of FIG. 2.

FIG. 3 shows the internal structure of PC 7. As shown in FIG. 3, PC 7 includes memory 19, which comprises a computer-readable medium such as a computer hard disk and/or RAID ("redundant array of inexpensive disks"). Memory 19 stores data 20, applications 21, print driver 22, and operating system 24. In preferred embodiments of the invention, operating system 24 is a windowing operating system, such as Microsoft® Windows98; although the invention may be used with other operating systems as well. Among the applications stored in memory 19 are multimedia application 25, video coder 26, video decoder 27, and flow controller 29.

Figure 4:
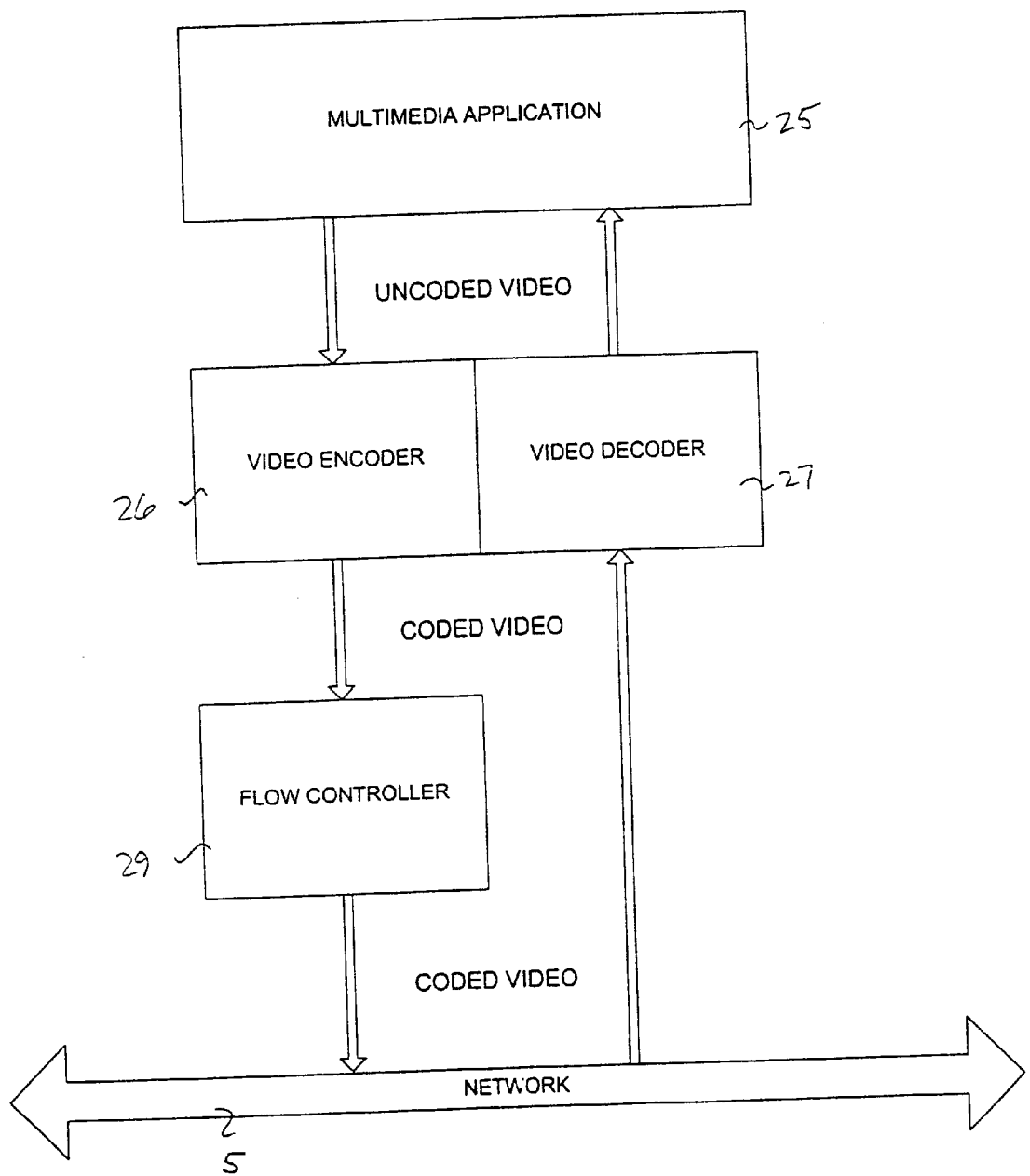
FIG. 4 shows the location of the flow controller of the present invention in a data stream between a multimedia application and the network.

In brief, multimedia application 25 can comprise any of a number of well-known multimedia applications for processing, viewing, and editing video. As shown in FIG. 4, video coder 26 comprises a video encoding application which encodes video data output from multimedia application 25. Any of a number of well-known coding techniques may be used, including, but not limited to, DVB, MPEG-1, MPEG-2 and MPEG-4. Video decoder 27 comprises a video decoding application which decodes video data coded, e.g., according to one of these techniques. Flow controller 29 implements the present invention by controlling the output of coded video data to network 5, as described in detail below. In this regard, although the preferred embodiment of the invention is used in connection with controlling the flow of coded video data, the invention can be used to control the flow of uncoded video (or non-video) data as well.

Returning to FIG. 3, PC 7 also includes display interface 30, keyboard interface 31, mouse interface 32, disk drive interface 34, DVD drive interface 35, computer bus 36, RAM 37, processor 39, and printer interface 40. Processor 39 preferably comprises a microprocessor or the like for executing applications, such those noted above, out of RAM 37. Such applications, including multimedia application 25, video coder 26, video decoder 27, and flow controller 29, may be stored in memory 19 (as noted above) or, alternatively, on a floppy disk in disk drive 15 or a DVD in DVD drive 16. Processor 39 accesses applications (or other data) stored on a floppy disk via disk drive interface 34 and accesses applications (or other data) stored on a DVD via DVD drive interface 35.

Application execution and other tasks of PC 7 may be initiated using keyboard 12 or mouse 14, commands from which are transmitted to processor 39 via keyboard interface 31 and mouse interface 32, respectively. Output results from applications running on PC 7 may be processed by display interface 30 and then displayed to a user on display 11 or, alternatively, output to network 5 via network connection 9. For example, input video data which has been processed by multimedia application 25 and then coded by video coder 26 is typically output via network connection 9 by flow controller 29, as shown in FIG. 4. On the other hand, coded video data which has been received from the network is decoded by video decoder 27 and then displayed on display 11 using the multimedia application. To this end, display interface 30 preferably comprises a display processor for forming video images based on decoded video data provided by processor 39 over computer bus 36, and for outputting those images to display 11. Output results from other applications, such as word processing programs, running on PC 7 may be provided to printer 17 via printer interface 40 (or alternatively, to a printer on network 5—not shown). Processor 39 executes print driver 22 so as to perform appropriate formatting of such print jobs prior to their transmission to the printer.

Turning to flow controller 29, this application is executed by transmitter 2 in order to transmit coded video (or other) data to the network. In brief, flow controller 29 comprises computer-executable code (i.e., process steps) to control data output to the network by determining a maximum amount of data that could be output to the network based on an amount of data that can be read from the network during a predetermined time period, and then obtaining a difference between an amount of data which has actually been output to the network and the maximum amount. Thereafter, flow controller 29 outputs, to the network and within the predetermined time period, an amount of data packets that is based on the difference. For a last data packet to be output to the network in the predetermined time period, flow controller 29 determines a first number of bits by which an amount of data will exceed the difference in the event that the data packet is output to the network, determines a second number of bits by which an amount of data will fall short of the difference in the event that the data packet is not output to the network, and outputs the data packet in a case that the first number is less than the second number. Otherwise, the data packet is not output to the network.

Figure 5:
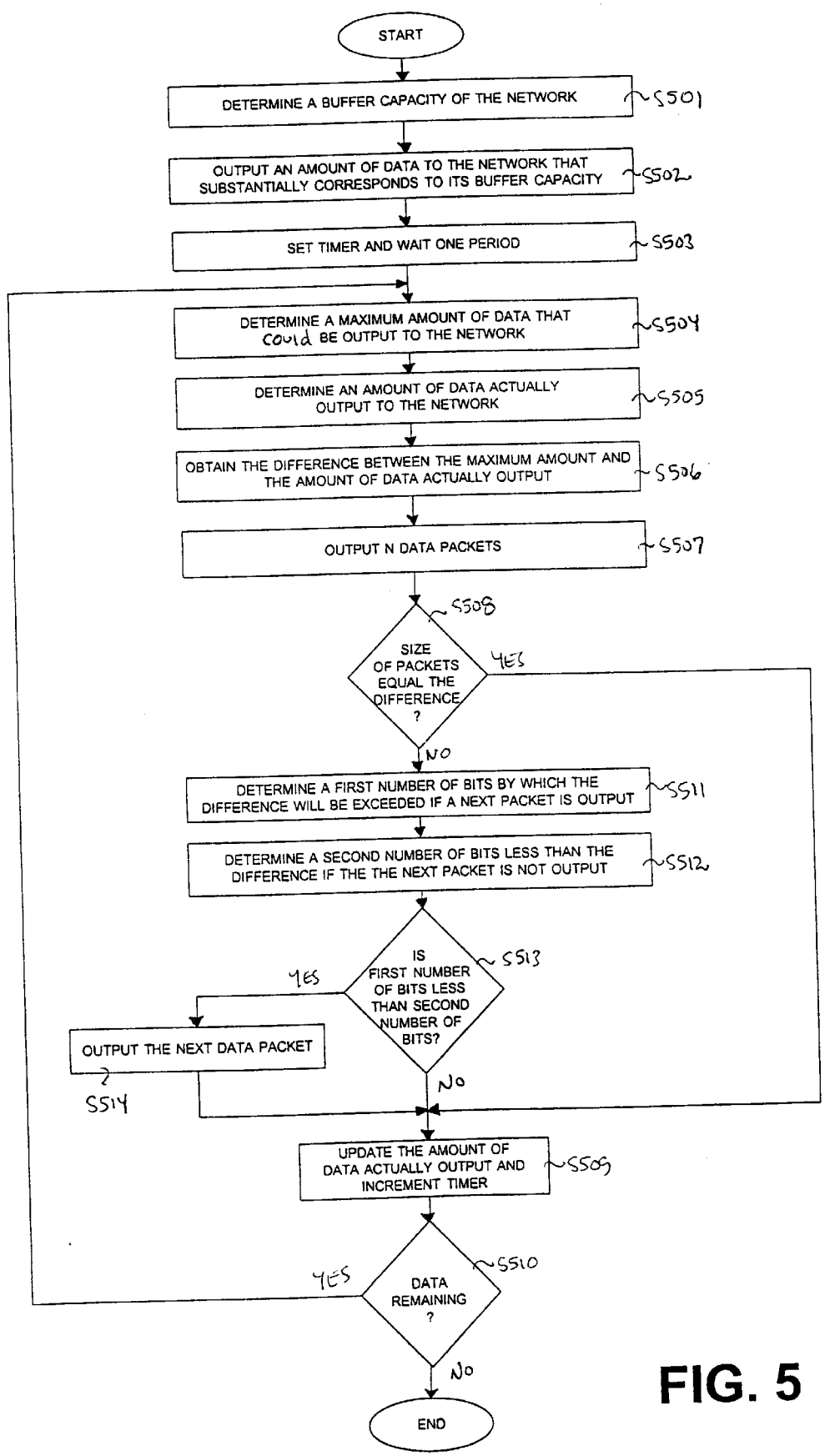
FIG. 5 shows process steps for implementing the invention.

In more detail, FIG. 5 shows process steps for implementing flow controller 29. To begin, step S501 determines a buffer capacity of the network (e.g., network 5). In this regard, while data packets are on the network, the network effectively acts as a buffer, the capacity of which is based on the network's bandwidth and the network delay. In this regard, the network delay comprises the time it takes for data packets to move from a client to a server in one direction on the network. The bandwidth used to calculate the buffer's capacity is the minimum available bandwidth on the network taking into consideration other network users, as well as other factors pertaining to the network, such as capacity and the like. This minimum available bandwidth is referred to herein as the network's "bottleneck" bandwidth. In this regard, the invention may be used with networks comprised of a plurality of different segments, each having a different bandwidth. The segment having the least amount of available bandwidth is thus used to determine the network's buffer capacity, whilst the remaining bandwidths are disregarded. The reason for using the least amount of available bandwidth, rather than the other bandwidths, is that the bottleneck bandwidth dictates the maximum bitrate that the network can handle without losing substantial amounts of data and/or becoming unduly congested.

Figure 6:
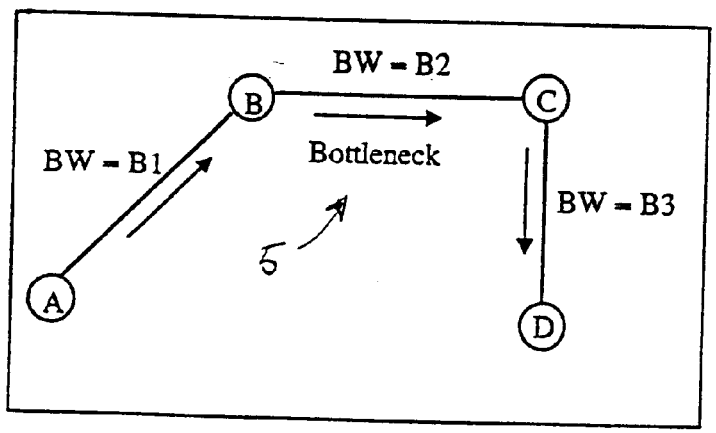
FIG. 6 shows various segments of the network shown in FIG. 1, each having a different bandwidth.
Figure 7:
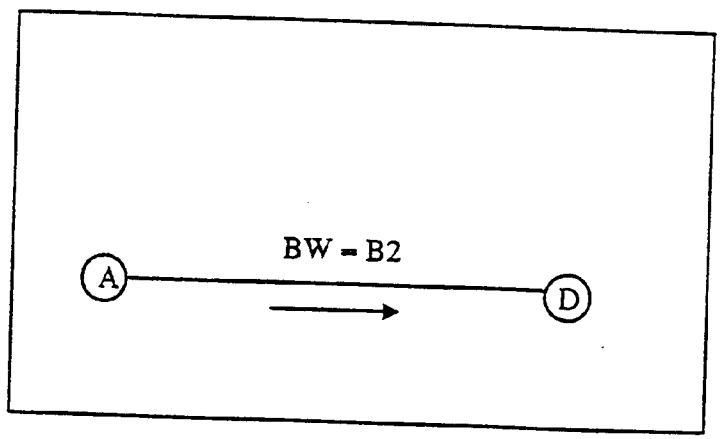
FIG. 7 shows the effective bandwidth of the network for the purposes of the invention, which bandwidth is the least amount of available bandwidth for the segments depicted in FIG. 6.

Thus, as shown in FIG. 6, network 5 may include plural segments having bandwidths $B_1$, $B_2$ and $B_3$. In this case, bandwidth $B_2$ comprises the least amount of available bandwidth on the network, and thus the bottleneck bandwidth. Accordingly, for the purposes of the present invention, network 5 can be abstracted as shown in FIG. 7. That is, network 5 can be thought of as having a single bandwidth $B_2$. Once the bottleneck bandwidth has been determined, step S501 determines the buffer capacity of network 5 using the bottleneck bandwidth and the network delay for network 5. Specifically, the buffer capacity of network 5 is determined as follows $$\text{Capacity} = B_2 * \text{Network Delay}. \qquad (1)$$

As noted above, the network delay comprises the time it takes for data packets to move from a client to a server in one direction on the network, i.e., as opposed to a round trip.

Following step S501, processing proceeds to step S502. In step S502, the invention outputs an amount of data to network 5 that substantially corresponds to the buffer capacity of the network. For example, the amount of data that is output can be within a predetermined range both above and below the network's buffer capacity. In the event that the amount of data exceeds the network's buffer capacity, the excess data may be absorbed by buffers that exist at each node of the network. In preferred embodiments of the invention, step S502 outputs packets of video data that have been coded by video coder 26 according to any of a number of known techniques, such as DVB, MPEG-1, MPEG-2, MPEG-4, etc.

As background, MPEG coding is performed on a frame of video data by dividing the frame into macroblocks of 16×16 pixels, each having a separate quantizer scale value. associated therewith. Motion estimation is then performed on the macroblocks so as to generate motion vectors for objects (i.e., moving images) in respective frames, and thereby reduce the amount of data that must be transmitted. The macroblocks are then divided into individual blocks of 8×8 pixels. These 8×8 pixel blocks are each subjected to a discrete cosine transform (hereinafter "DCT") which generates DCT coefficients for each of the 64 pixels therein. DCT coefficients in an 8×8 pixel block are then divided by a corresponding coding parameter, namely a quantization weight. Thereafter, additional calculations are effected on the DCT coefficients in order to take into account the quantizer scale value, among other things. Variable-length coding is then performed on the DCT coefficients so as to generate coded video data for the frame. A more complete description of MPEG coding is provided in U.S. patent application Ser. No. 09/094,828, entitled "Pixel Data Storage System For Use In Half-Pel Interpolation", filed Jun. 15, 1998, the contents of which are hereby incorporated by reference into the subject application as if set forth herein in full.

The motion vectors described above are used to reconstruct frames of video from existing frames. In this regard, MPEG codes base frames, called intra (or "I") frames, and also codes data for predictive (or "P") frames which comprise frames that are predicted from preceding I or P frames using the motion vectors, and bi-directional (or "B") frames which are interpolated from preceding I or P frames and succeeding I or P frames. The I frames are key to accurate video reconstruction, since they include the most data. The present invention recognizes this by determining, in step S502, if there is sufficient bandwidth on the network to accommodate all frames of a video transmission. If there is insufficient bandwidth, the invention drops the frames that cannot be accommodated, starting with the P and B frames. Any I frames are dropped last, thus ensuring that as many I frames as possible are output to the network under the circumstances.

Next, in step S503, a time period/interval of a duration "t" is set. In this same step, the invention waits one such time period, during which the receiver reads data from the network. Once this data has been read, the invention can then output more data to the network, as described in detail below. In step S503, the time period can be retrieved automatically from memory. Alternatively, the time period can be set and/or changed manually via the transmitter's keyboard or mouse. In this regard, by decreasing the time period, it is possible to provide an increase in video granularity (i.e., resolution). That is, as described in more detail below, the invention outputs coded video data to the network so as to fill the network buffer at each time period. By decreasing the duration of the time period, the frequency at which the invention fills the buffer is increased (i.e., there are more intervals during which to fill the buffer). This results in increased video granularity.

Following step S503, step S504 determines a maximum amount of data that the transmitter could output to the network. Specifically, the maximum amount of data, "ET(i)", that could be output to the network corresponds to the amount of data that the transmitter could have output to the network up through the "$i^{th}$" (i.e., the current) time period. This maximum amount of data ET(i) is based on an amount (e.g., a number of bits) of data that can be read from the network by the receiver during the $i^{th}$ time period. In this regard, the amount of data that can be read per time period is determined as follows $$\text{Amount Read} = B_2 * t, \quad (2)$$

where $B_2$ comprises the network's bottleneck bandwidth and "t" comprises the duration of the current time interval "i". Thus, ET(i), which corresponds to the maximum amount of data that could be output by the transmitter, is determined by $$ET(i) = ET(i-1) + B_2 * t, \quad (3)$$

where "ET(i−1)" corresponds to the amount of data that the transmitter could have output to the network up through the "$i-1^{st}$" time period. Thus, as is clear from equation (3), the maximum rate at which data can be output to the network (i.e., the maximum amount of data that can be output during the current time period) corresponds to the rate at which data is read from the network. This is set as such by the invention in order to avoid network congestion and/or buffer overflow and underflow.

Following step S504, processing proceeds to step S505. Step S505 determines an amount of data, "CT(i−1)", that has actually been output to the network as of the start of time period "i". This value is calculated by summing the number of bits in all packets output to the network up to the current time period. Once CT(i−1) is determined, step S506 obtains the difference between the maximum amount of data that could be output to the network from step S504 and the amount of data that has actually been output to the network from step S505. This difference, called "Q(i)", comprises a quota of data that can be output to the network by the transmitter (i.e., the data source) during time period "i". In mathematical terms, Q(i) is defined as follows $$Q(i) = ET(i) - CT(i-1). \quad (4)$$

Following step S506, processing proceeds to step S507. In step S507, the transmitter outputs N (N≥1) data packets based on the difference determined in step S506. That is, by calculating the difference above between the maximum amount of data that could be output to the network and the amount that has actually been output, the invention obtains the current excess capacity of the network, and thus the amount of additional data that the network can handle. This value is then passed to the transmitter, which outputs an amount of data (i.e., N data packets) that is less than or equal to the excess capacity of the network. Following this step, processing proceeds to step S508.

Step S508 determines whether the amount of data in the N packets (i.e., the size, "T(i)", of the N packets) is equal to the excess capacity of the network (i.e., the difference obtained in step S506). If this is the case, processing proceeds to step S509, in which the timer is incremented and the amount of data actually output, CT(i), is updated as follows $$CT(i) = CT(i-1) + T(i). \quad (5)$$

Processing then proceeds to step S510, which determines whether there is any remaining data to be transmitted. If there is no data remaining to be transmitted, processing ends. On the other hand, if data remains to be transmitted, processing returns to step S504 or, alternatively, to step S503 if a change in the timer interval is desired, whereafter the foregoing is repeated.

On the other hand, if step S508 determines that the amount of data in the N packets is not equal to the excess capacity of the network (i.e., if T(i) is not equal to the difference obtained in step S506), the network may be able to accommodate additional data packets. Accordingly, processing in this case proceeds to steps S511 to S514, which determine whether an additional packet should be output under the circumstances.

To begin, step S511 determines a first number of bits $D_1$ by which the difference determined in step S506 (i.e., the network capacity) will be exceeded if another (i.e., $N+1^{st}$) data packet is output. Specifically, $D_1$ is determined by adding the amount of data (i.e., the number of bits) in the $N+1^{st}$ data packet, namely P(N+1), to the number of bits comprising the N packets output in step S507, namely T(i), and subtracting from this sum the network capacity, namely Q(i). In mathematical terms, this is expressed as follows $$D_1 = T(i) + P(N+1) - Q(i). \quad (6)$$

Thereafter, step S512 determines a second number of bits $D_2$, which corresponds to the amount of excess network capacity if another (i.e., $N+1^{st}$) data packet is not output. In other words, $D_2$ equals a number of bits by which an amount of data on the network will fall short of the network capacity if the $N+1^{st}$ data packet is not output. Specifically, $D_2$ is determined by subtracting the number of bits comprising the N packets output in step S507, namely T(i), from the network capacity, Q(i). In mathematical terms, this is expressed as follows $$D_2 = Q(i) - T(i)^* \quad (7)$$

Next, step S513 determines whether $D_1$ is less than $D_2$. If $D_1$ is less than $D_2$, this means that the amount by which the $N+1^{st}$ data packet will exceed the network's capacity is less than the amount by which the network will fall short of capacity if the $N+1^{st}$ is not output. Thus, if outputting the $N+1^{st}$ data packet will cause the network to come closer to its capacity than not outputting the $N+1^{st}$ data packet, step S514 outputs the $N+1^{st}$ data packet. The amount of data which exceeds the capacity of the network may be stored in buffers at the network's nodes. Thereafter, step S509 increments the timer and updates the amount of data actually output, CT, as follows $$CT(i) = CT(i-1) + P(N+1) + T(i). \quad (8)$$

Processing then proceeds to step S510, which determines whether there is any remaining data to be transmitted. If there is no data remaining to be transmitted, processing ends. On the other hand, if data remains to be transmitted, processing returns to step S504 or, alternatively, to step S503 if a change in the timer interval is desired. Thereafter, the foregoing is repeated for new data in the next time period.

Returning to step S513, if $D_1$ is greater than $D_2$, this means that the amount by which the $N+1^{st}$ data packet will exceed the network's capacity is greater than the amount by which the network will fall short of its capacity if the $N+1^{st}$ is not output. Thus, since not outputting the $N+1^{st}$ data packet will cause the network to come closer to its capacity than outputting the $N+1^{st}$ data packet, the $N+1^{st}$ data packet is not output. Thereafter, processing proceeds to step S509, in which the amount of data actually output, CT, is updated as follows $$CT(i) = CT(i-1) + T(i). \quad (9)$$

It is noted that a value for P(N+1) is not included in equation (9) (as opposed to equation (8) above) because, in this case, an additional packet was not output. Processing then proceeds to step S510 which determines whether there is any remaining data to be transmitted. If there is no data remaining to be transmitted, processing ends. On the other hand, if data remains to be transmitted, processing returns to step S504 or, alternatively, to step S503 if a change in the timer interval is desired. Thereafter, the foregoing is repeated for new data in a next time period. At this point, it is noted that the invention is not limited to making its determinations based on outputting a single $N+1^{st}$ data packet. That is, the foregoing determinations can also be made based on outputting a plurality of data packets after the initial N data packets.

By virtue of steps S508 to S514, the invention is able to maintain the network at capacity (or as close thereto as is possible under the circumstances) without unduly congesting the network or causing substantial underflow or overflow of the network buffer. As a result, the invention is able to provide video having substantially the highest granularity possible given the amount of available network bandwidth. In this regard, as noted above, the invention preferably transmits MPEG-encoded video data, which includes I, P and B frames. In cases where the bandwidth of the network is unable to accommodate all data provided by video coder 26, as noted above, the present invention will "drop" some or all of the P and/or B frames when outputting the data packets in steps S502, S507 and/or S514, in order to conserve bandwidth for the I frames.

This most often (but not always) occurs in cases where the invention is used with variable-bandwidth networks since, when the invention is used with constant bandwidth networks, the video data can be coded at an appropriate bitrate for the network's bottleneck. In the case of a variable-bandwidth network (and constant-bandwidth networks, for that matter), the receiver can get an approximate measure of the network's bottleneck bandwidth by counting the number of bits per second that it receives from the transmitter. This bottleneck bandwidth measurement can then be communicated back to the transmitter, via the network (e.g., through RTCP, etc.), and used in the process shown in FIG. 5.

Finally, it is noted that although the preferred embodiment of the invention shows a software implementation of the invention, aspects thereof may be implemented in hardware as well. For example, the video coder, video decoder, and flow controller can all comprise discrete hardware elements. In the case of the flow controller, this means that the flow controller can comprise adders, multipliers, and the like for effecting the functionality shown in FIG. 5.

In this regard, the present invention has been described with respect to a particular illustrative embodiment. It is to be understood that the invention is not limited to the above-described embodiment and modifications thereto, and that various changes and modifications may be made by those of ordinary skill in the art without departing from the spirit and scope of the appended claims.

What is claimed is:

1. A method of controlling data output to a network, the method comprising the steps of:

determining a maximum amount of data that could be output to the network based on an amount of data that can be read from the network during a predetermined time period;

obtaining a difference-between an amount of data that has actually been output to the network and the maximum amount; and outputting, to the network and within the predetermined time period, an amount of data packets that is based on the difference.

2. A method according to claim 1, wherein, for a last data packet to be output to the network in the predetermined time period, the outputting step comprises:

determining a first number of bits by which an amount of data will exceed the difference in the event that the data packet is output to the network;

determining a second number of bits by which an amount of data will fall short of the difference in the event that the data packet is not output to the network; and outputting the data packet in a case that the first number is less than the second number.

3. A method according to claim 1, further comprising, before the determining step, the steps of:
    determining a data capacity of the network; and
    outputting an amount of data to the network that substantially corresponds to the data capacity of the network.

4. A method according to claim 1, wherein the network comprises a plurality of network segments, each of the network segments having a different bandwidth; and
    wherein the determining step determines the maximum amount of data that could be output to the network based on an amount of data that can be handled by the network segment having a least amount of available bandwidth.

5. A method according to claim 1, wherein the data packets comprise intra (I) frames of video, together with at least one of predictive (P) frames and bi-directional (B) frames; and
    wherein the outputting step comprises outputting the intra frames and not outputting at least some of the predictive frames and/or the bi-directional frames.

6. A method according to claim 5, wherein the maximum amount of data that could be output to the network is determined based, in part, on a bandwidth of the network;
    wherein the bandwidth of the network varies over time; and
    wherein the outputting step determines whether to output the predictive frames and the bi-directional frames based on the bandwidth of the network.

7. A method according to claim 1, wherein the data packets comprise video which has been coded using one of MPEG-1, MPEG-2 and MPEG-4; and
    wherein the network comprises the Internet.

8. A method according to claim 1, wherein the data packets output to the network are coded at a bitrate that substantially corresponds to a bandwidth of the network.

9. An apparatus for controlling data output to a network, the apparatus comprising:
    a memory which stores computer-executable process steps; and
    a processor which executes the process steps stored in the memory so as (i) to determine a maximum amount of data that could be output to the network based on an amount of data that can be read from the network during a predetermined time period, (ii) to obtain a difference between an amount of data which has actually been output to the network and the maximum amount, and (iii) to output, to the network and within the predetermined time period, an amount of data packets that is based on the difference.

10. An apparatus according to claim 1, wherein, for a last data packet to be output to the network in the predetermined time period, the processor (i) determines a first number of bits by which an amount of data will exceed the difference in the event that the data packet is output to the network, (ii) determines a second number of bits by which an amount of data will fall short of the difference in the event that the data packet is not output to the network, and (iii) outputs the data packet in a case that the first number is less than the second number.

11. An apparatus according to claim 9, wherein, before determining the maximum amount of data, the processor (i) determines a data capacity of the network, and (ii) outputs an amount of data to the network that substantially corresponds to the data capacity of the network.

12. An apparatus according to claim 9, wherein the network comprises a plurality of network segments, each of the network segments having a different bandwidth; and
    wherein the processor determines the maximum amount of data that could be output to the network based on an amount of data that can be handled by the network segment having a least amount of available bandwidth.

13. An apparatus according to claim 9, wherein the data packets comprise intra (I) frames of video, together with at least one of predictive (P) frames and bi-directional (B) frames; and
    wherein, during output, the processor outputs the intra frames and does not output at least some of the predictive frames and/or the bi-directional frames.

14. An apparatus according to claim 13, wherein the maximum amount of data could be output to the network is determined based, in part, on a bandwidth of the network;
    wherein the bandwidth of the network varies over time; and
    wherein the processor determines whether to output the predictive frames and the bi-directional frames based on the bandwidth of the network.

15. An apparatus according to claim 9, wherein the data packets comprise video which has been coded using one of MPEG-1, MPEG-2 and MPEG-4; and
    wherein the network comprises the Internet.

16. An apparatus according to claim 9, wherein the data packets output to the network are coded at a bitrate that substantially corresponds to a bandwidth of the network.

17. Computer-executable process steps stored on a computer-readable medium, the computer-executable process steps to control data output to a network, the computer-executable process steps comprising:
    code to determine a maximum amount of data that could be output to the network based on an amount of data that can be read from the network during a predetermined time period;
    code to obtain a difference between an amount of data that has actually been output to the network and the maximum amount; and
    code to output, to the network and within the predetermined time period, an amount of data packets that is based on the difference.

18. Computer-executable process steps according to claim 17, wherein, for a last data packet to be output to the network in the predetermined time period, the outputting code (i) determines a first number of bits by which an amount of data will exceed the difference in the event that the data packet is output to the network, (ii) determines a second number of bits by which an amount of data will fall short of the difference in the event that the data packet is not output to the network, and (iii) outputs the data packet in a case that the first number is less than the second number.

19. Computer-executable process steps according to claim 17, further comprising:
    code to determine a data capacity of the network; and
    code to output an amount of data to the network that substantially corresponds to the data capacity of the network.

20. Computer-executable process steps according to claim 17, wherein the network comprises a plurality of network segments, each of the network segments having a different bandwidth; and
    wherein the determining code determines the maximum amount of data that could be output to the network based on an amount of data that can be handled by the network segment having a least amount of available bandwidth.

21. Computer-executable process steps according to claim 17, wherein the data packets comprise intra (I) frames of video, together with at least one of predictive (P) frames and bi-directional (B) frames; and wherein the outputting code comprises code to output the intra frames and not to output at least some of the predictive frames and/or the bi-directional frames.

22. Computer-executable process steps according to claim 21, wherein the maximum amount of data that could be output to the network is determined based, in part, on a bandwidth of the network;

wherein the bandwidth of the network varies over time; and wherein the outputting code determines whether to output the predictive frames and the bi-directional frames based on the bandwidth of the network.

23. Computer-executable process steps according to claim 17, wherein the data packets comprise video which has been coded using one of MPEG-1, MPEG-2 and MPEG-4; and wherein the network comprises the Internet.

24. Computer-executable process steps according to claim 17, wherein the data packets output to the network are coded at a bitrate that substantially corresponds to a bandwidth of the network.

25. An apparatus for controlling data output to a network, the apparatus comprising:

determining means for determining a maximum amount of data that could be output to the network based on an amount of data that can be read from the network during a predetermined time period;

obtaining means for obtaining a difference between an amount of data that has actually been output to the network and the maximum amount; and outputting means for outputting, to the network and within the predetermined time period, an amount of data packets that is based on the difference.

26. A network system in which flows of video data are controlled so as to reduce data congestion on the network, the network system comprising:

a transmitter which codes the video data and which outputs coded video data to the network; and a receiver which reads the coded video data from the network at a predetermined rate, which decodes the coded video data, and which forms images based on the decoded video data;

wherein the transmitter outputs the coded video data to the network at substantially a same rate at which the receiver reads the coded video data from the network.

27. A network system according to claim 26, wherein the network comprises the Internet; and wherein the transmitter and the receiver both comprise personal computers.

28. A network system according to claim 26, wherein the receiver comprises a digital television system.

29. A network system according to claim 26, wherein the transmitter outputs the coded video data to the network by (i) determining a maximum amount of data that could be output to the network based on an amount of data that can be read from the network by the receiver during a predetermined time period, (ii) obtaining a difference between an amount of data that has actually been output to the network and the maximum amount, and (iii) outputting, to the network and within the predetermined time period, an amount of the coded video data that is based on the difference.

30. A network system according to claim 26, wherein the transmitter codes the video data using one of the following coding techniques: MPEG-1, MPEG-2 and MPEG-4.

* * * * *